(12) United States Patent
Sun et al.

(10) Patent No.: US 10,050,755 B2
(45) Date of Patent: Aug. 14, 2018

(54) METHOD AND DEVICES FOR ALLOCATING UPLINK REFERENCE SIGNAL RESOURCES IN COMBINED CELLS

(71) Applicant: Telefonaktiebolaget LM Ericsson (publ), Stockholm (SE)

(72) Inventors: Ying Sun, Sundbyberg (SE); Wei Zhao, Solna (SE); Yufeng Zhao, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 168 days.

(21) Appl. No.: 15/101,279

(22) PCT Filed: Dec. 20, 2013

(86) PCT No.: PCT/EP2013/077774
§ 371 (c)(1),
(2) Date: Jun. 2, 2016

(87) PCT Pub. No.: WO2015/090463
PCT Pub. Date: Jun. 25, 2015

(65) Prior Publication Data
US 2016/0359599 A1 Dec. 8, 2016

(51) Int. Cl.
*H04W 4/00* (2018.01)
*H04L 5/00* (2006.01)
(Continued)

(52) U.S. Cl.
CPC .......... *H04L 5/0048* (2013.01); *H04L 5/0085* (2013.01); *H04W 28/0278* (2013.01);
(Continued)

(58) Field of Classification Search
CPC .......... H04L 2012/5608; H04W 84/12; H04W 88/08; H04W 72/04; H04W 76/00;
(Continued)

(56) References Cited

U.S. PATENT DOCUMENTS

| 2012/0281567 A1* | 11/2012 | Gao | H04B 7/0626 370/252 |
| 2013/0189930 A1* | 7/2013 | Kinnunen | H04W 16/12 455/67.11 |

FOREIGN PATENT DOCUMENTS

WO 2012151064 A2 11/2012

OTHER PUBLICATIONS

Alcatel-Lucent Shanghai Bell, et al., "R1-112793: CoMP Phase 2 Evaluation for Scenario 3: FDD Downlink," 3rd Generation Partnership Project (3GPP), TSG RAN WG1 Meeting #66, Aug. 22-26, 2011, 11 pages, Athens, Greece.
Intel Corporation, et al., "R1-123178: Enhancements to SRS Configurations for UL CoMP," 3rd Generation Partnership Project (3GPP), TSG-RAN WG1 Meeting #70, Aug. 13-17, 2012, 6 pages, Qingdao, China.
(Continued)

*Primary Examiner* — Brenda H Pham
(74) *Attorney, Agent, or Firm* — Sage Patent Group

(57) ABSTRACT

The disclosure relates to a method performed in a network node for allocating uplink reference signal resources. The network node is capable of uplink frequency selective scheduling and combined cell configuration. The network node is further arranged to provide wireless communication to a communication device. The method comprises configuring, when both uplink frequency selective scheduling and the combined cell configuration are enabled, a communication device for which uplink frequency selective scheduling is enabled with resources from a second set of resources and configuring other communication devices with resources from a first set of resources, and allocating uplink reference signal resources from the first set of resources or the second set of resources to the communication devices according to the configuration.

9 Claims, 3 Drawing Sheets

(51) Int. Cl.
*H04W 28/02* (2009.01)
*H04W 72/04* (2009.01)
*H04W 72/12* (2009.01)
*H04W 84/04* (2009.01)

(52) U.S. Cl.
CPC ..... *H04W 72/0413* (2013.01); *H04W 72/121* (2013.01); *H04L 5/006* (2013.01); *H04L 5/0035* (2013.01); *H04W 84/042* (2013.01)

(58) Field of Classification Search
CPC .... H04W 36/30; H04W 36/24; H04B 7/2045; H04B 7/208; H04B 7/2123; H04B 7/212
USPC .... 370/310.2, 319, 322, 329, 332, 328, 341, 370/348
See application file for complete search history.

(56) References Cited

OTHER PUBLICATIONS

Interdigital Communications, LLC, "R1-112238: CoMP Phase 2 performance results," 3rd Generation Partnership Project (3GPP), TSG RAN WG1 Meeting #66, Aug. 22-26, 2011, 5 pages, Athens, Greece.

Motorola, "Tdoc R2-061915: Comparison of UL buffer reporting/scheduling schemes in LTE," 3rd Generation Partnership Project (3GPP), TSG-RAN-WG2 LTE Ad Hoc Meeting, Jun. 27-30, 2006, 4 pages, Cannes, France.

International Search Report and Written Opinion for International Patent Application No. PCT/EP2013/077774, dated Jul. 18, 2014, 13 pages.

* cited by examiner

METHOD AND DEVICES FOR ALLOCATING UPLINK REFERENCE SIGNAL RESOURCES IN COMBINED CELLS

This application is a 35 U.S.C. § 371 national phase filing of International Application No. PCT/EP2013/077774, filed Dec. 20, 2013, the disclosure of which is incorporated herein by reference in its entirety.

TECHNICAL FIELD

The technology disclosed herein relates generally to the field of resource allocation in wireless communication systems, and in particular to allocation of resources for uplink reference signals in such wireless communication systems.

BACKGROUND

Combined cell, also denoted shared cell or multi-sector cell in some cases, is a recent cell configuration for Long Term Evolution (LTE) and enables a multi Radio Resource Unit (RRU) deployment that does not require extra cell planning effort from a Radio Frequency (RF) perspective. This is achieved by allowing the different RRUs to use the same Physical Cell Identity (PCI) and thus all RRUs are considered, by a communication device, to be part of the same cell. The spatially separated RRUs, or group of RRUs, are called sector. A cell can contain multiple sectors, and transmission to and reception from the communication device can be done by one sector or multiple sectors depending on the degree of sector isolation. The same time and frequency resources may also be used on different sectors.

The combined cell extends the indoor and outdoor coverage of a single cell and entails several advantages. Coverage holes may be reduced by allowing multiple coverage areas within the same cell. The chance of receiving a communication device signal from selected sector carriers having the best coverage quality is increased. There is no need for inter-cell handover within a combined cell and uplink macro diversity is supported by the use of multiple antennas within the same (combined) cell.

From the above it is clear that the combined cell is an important feature of LTE. Uplink Frequency Selective Scheduling (UL FSS) is another important feature of LTE. In particular, UL FSS is a scheduling scheme which adopts frequency selective channel quality to prioritize communication devices and allocate resources. In UL FSS uplink, channel quality of the entire frequency spectrum is measured, and the part of the spectrum that has the best channel quality is allocated to the communication devices that have the highest priority. UL FSS provides increased throughput for cell edge users as well as increased cell throughput in a system using channel dependent scheduling.

In the deployment of combined cell, an evolved Node B (eNodeB or eNB) needs to keep track of which sector(s) a communication device should use. This sector selection is done by using an uplink reference signal called Sounding Reference Signal (SRS). Basically, the eNB orders periodic SRS transmissions across all sectors of the combined cell and by measuring, for a specific communication device, SRS received signal strength/channel quality on all sectors, the eNB can determine one or multiple sectors that the communication device should belong to.

UL FSS also uses SRS to obtain selective channel quality and hence schedule the communication device on the best possible frequency. Thus both sector selection and UL FSS rely on SRS measurements to function properly. However, the characteristics of SRS measurements required by these two features are very different. Sector selection based SRS measurement could work in a slow manner with less frequent updating, i.e. could use a SRS configuration with a rather long periodicity, and the communication device does not need to scan the whole frequency band. On the other hand, frequency selective scheduling and link adaptation requires fast updates and sub-band channel quality measurement, i.e. a SRS configuration with short periodicity should be used, and the communication device needs to scan the whole frequency band.

The UL FSS and combined cell are both important features and would both preferably be implemented simultaneously. In a combined cell configuration in which the UL FSS is also used, fast SRS are allocated to the communication devices to accommodate the need of the UL FSS for fast SRS resources. For sector selection purposes, this leads to SRS consuming more processing power than actually needed since more SRS measurements are received than needed, which in turn limits the system capacity. For UL FSS, given the currently supported number of active communication devices in a cell, this leads to the required SRS resource capacity exceeding the upper limit specified by 3GPP, making it unfeasible to use UL FSS in combined cell scenarios.

The conflict in the SRS configuration requirements has led to the fact that UL FSS cannot be used in combined cell deployment. The current solution has therefore resulted in that UL FSS is disabled in many cell configurations, and UL FSS and combined cell cannot be enabled simultaneously.

SUMMARY

An object of the present disclosure is to solve or at least alleviate at least one of the above mentioned problems.

The object is according to a first aspect achieved by a method performed in a network node for allocating uplink reference signal resources. The network node is capable of uplink frequency selective scheduling and combined cell configuration. The network node is further arranged to provide wireless communication to a communication device. The method comprises: configuring, when both uplink frequency selective scheduling and the combined cell configuration are enabled, a communication device for which uplink frequency selective scheduling is enabled with resources from a second set of resources and configuring other communication devices with resources from a first set of resources, and allocating uplink reference signal resources from the first set of resources or the second set of resources to the communication devices according to the configuration.

The method enables support for co-existence of uplink frequency selective scheduling and combined cell, which are two important features and highly desirable to use simultaneously. The method is compatible with existing communication standards.

The object is according to a second aspect achieved by a network node for allocating uplink reference signal resources. The network node is capable of uplink frequency selective scheduling and combined cell configuration. The network node is further arranged to provide wireless communication to a communication device. The network node comprises a processor and memory, the memory containing instructions executable by the processor, whereby the network node is operative to: configure, when both uplink frequency selective scheduling and the combined cell configuration are enabled, a communication device for which uplink frequency selective scheduling is enabled with resources from a second set of resources and configuring other communication devices with resources from a first set of resources, and allocate uplink reference signal resources from the first set of resources or the second set of resources to the communication devices according to the configuration.

The object is according to a third aspect achieved by a computer program for a network node for allocating uplink reference signal resources. The network node is capable of uplink frequency selective scheduling and combined cell configuration, and to provide wireless communication to a communication device. The computer program comprises computer program code, which, when run on the network node causes the network node to: configure, when both uplink frequency selective scheduling and the combined cell configuration are enabled, a communication device for which uplink frequency selective scheduling is enabled with resources from a second set of resources and configuring other communication devices with resources from a first set of resources, and allocate uplink reference signal resources from the first set of resources or the second set of resources to the communication devices according to the configuration.

The object is according to a fourth aspect achieved by a computer program product comprising a computer program as above, and a computer readable means on which the computer program is stored.

The object is according to a fifth aspect achieved by a network node for allocating uplink reference signal resources. The network node comprises: means for configuring, when both uplink frequency selective scheduling and the combined cell configuration are enabled, a communication device for which uplink frequency selective scheduling is enabled with resources from a second set of resources and configuring other communication devices with resources from a first set of resources, and means for allocating uplink reference signal resources from the first set of resources or the second set of resources to the communication devices according to the configuration.

Further features and advantages of the present teachings will become clear upon reading the following description and the accompanying drawings.

DETAILED DESCRIPTION

Figure 1:
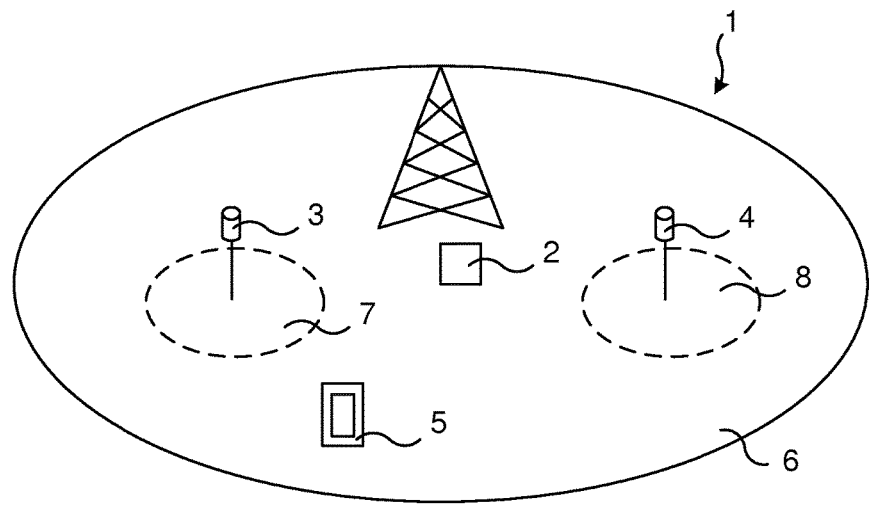
FIG. 1 illustrates schematically an environment in which embodiments of the present disclosure may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

As mentioned in the background section, fast SRS resources are configured for all communication devices in a combined cell that also uses UL FSS. SRS may be configured per communication device, e.g. to be transmitted in a transmission over the entire bandwidth or transmitted in several narrow band transmissions. However, the LTE standard only allows one SRS configuration to be set per communication device. The same SRS configuration must therefore be used for the communication device in a combined cell for both purposes, i.e. both for sector selection and UL FSS, and hence the shorter periodicity is used.

Briefly, the present disclosure provides solutions to address the described problems of co-existence of the features UL FSS and combined cell. The combined cell is a typical cell configuration in which slow SRS resource allocation is sufficient, whereas uplink frequency selective scheduling is a typical cell configuration in which fast SRS resource allocation is required. The present disclosure provides SRS allocation methods and means for supporting the co-existence of these two features in the same cell. In particular, by specifying a flexible SRS resource allocation scheme wherein both slow SRS (having long periodicity) and fast SRS (having short periodicity) can co-exist in the same sector, the features UL FSS and combined cell are enabled to function together. Further, by specifying selection criteria for which communication devices fast SRS should be configured, the use of UL FSS can be enabled in most cell configurations.

FIG. 1 illustrates an environment in which the present disclosure may be implemented. In particular, a wireless communication system 1 implements a combined cell deployment wherein a number of network nodes 2, 3, 4 use the same cell-specific identity (e.g. same physical cell identity, PCI) and therefore appears to communication devices 5 as a single cell. Within the coverage area of the combined cell 6 the communication device 5 may communicate with one or more of the network nodes 2, 3, 4. The network nodes 2, 3, 4 may for example comprise base stations such as eNBs (may also be referred to as access point) or remote radio units. The communication device 5 may be any type of wireless device, such as smart phone, mobile phone or laptop. The communication device is typically referred to as user equipment (UE) in wireless networks implementing LTE, but may also be denoted a mobile station or a subscriber station.

The present disclosure provides methods for allocating SRS resources to fulfill the need of having both fast and slow measurements. The SRS resources are divided into different pools, a fast resource pool and a slow resource pool. A fast SRS resource may be characterized by having a short periodicity, i.e. being transmitted often. A slow SRS resource may be characterized by having a long periodicity, i.e. being transmitted more seldom. As an example, different combs, or codes could be used to differentiate the resource pool. SRSs are transmitted in the last symbol of a subframe when scheduled. Further, the SRSs are time multiplexed, and mapped to every second subcarrier in the last symbol of a subframe, creating a comb-like pattern. That is, consecutive subcarriers may be allocated to communication devices alternatively. Such different combs may thus be used for differentiating the total number of resources into two resource pools. The communication devices allocated in different SRS resource pools will thus have different SRS periodicity, e.g. periodicity of 2, 5, 10, 20, 40, 80, 160 or 240 ms, i.e. be transmitted e.g. every 2nd ms, 5th ms, every 10th ms etc.

The decision on whether or not to allocate SRS and if so, what type of SRS, can be made in the following way:

1. Communication devices 5 in a combined cell may initially be configured with slow resources from slow SRS resource pool.

2. Once the communication device 5 is in a favorable condition, such that UL FSS can be enabled for this communication device 5, it may be reconfigured with fast resources from the fast SRS resource pool; that is, a SRS configuration to use fast SRS resources may be applied to this communication device.

3. When a communication device 5 is configured with fast SRS resources, sector selection may be based on the SRS measurement of the fast SRS configuration. When the favorable condition does not hold for the communication device 5 anymore, the communication device 5 may again be reconfigured to use slow SRS resources.

It is noted that the above embodiment of the method may be applied also for cases other than UL FSS versus combined cell when both slow and fast SRS resources are needed. The selection scheme for a communication device can be used in all cell configurations where UL FSS is applicable.

Figure 2:
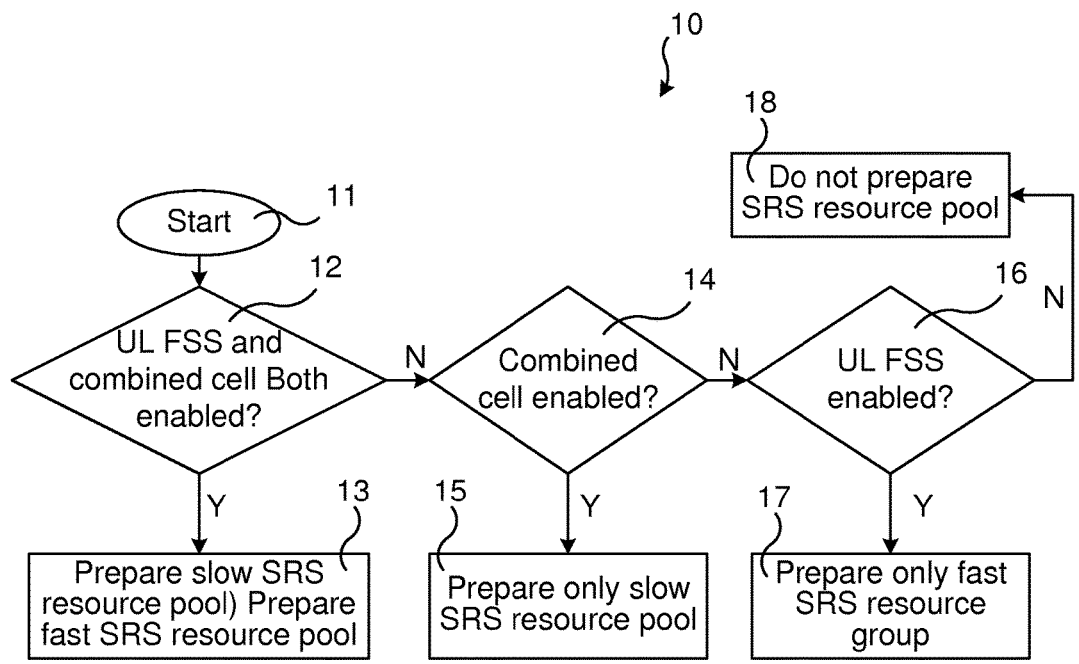
FIG. 2 illustrates a SRS resource allocation procedure.

In the following, an SRS resource allocation procedure 10 is described with reference to FIG. 2.

In box 11, SRS resources are organized into a slow SRS resource pool and a fast SRS resource pool and specified by a set of SRS configuration parameters. Such SRS configuration parameters may for example comprise a communication device specific periodicity, cell specific periodicity, hopping bandwidth, codewords, transmission comb etc. That is, the different SRS resources are given different characteristics; for instance, a fast SRS typically has a short periodicity, is measured in the entire frequency band, and/or are separated based on codewords; a slow SRS typically has a long periodicity, may be a narrowband SRS transmission (e.g. a few Physical Resource Blocks, PRB), may be measured per sector and not on the entire frequency band.

In box 12, the cell configuration is determined, e.g. by means of an SRS cell resource allocation check. If it is determined that the features frequency selective scheduling and combined cell configuration are both enabled, then, in box 13, the total number of SRS resources is partitioned into two resource pools, a fast SRS resource pool and a slow SRS resource pool. Each pool will have different SRS parameter settings and use one respective comb resource.

If, in box 12, it is determined that only one of these two features (UL FSS or combined cell) is enabled (or supported), the flow continues to box 14. In box 14, if it is determined that the combined cell feature is enabled, then, in box 15, all SRS resources are allocated to one SRS resource group (slow SRS) which will use both comb resources; i.e. the slow SRS resource group is given all available SRS resources.

If, in box 14, it is determined that the combined cell feature is not supported, the flow continues to box 16. In box 16, if it is determined that the UL FSS feature is enabled, then, in box 17, all SRS resources are allocated to one SRS resource group (fast SRS) which will use both comb resources; i.e. the fast SRS resource group is given all available SRS resources.

If, in box 16 it is determined that the UL FSS is not used either, then the flow continues to box 18, and no preparation of SRS resource pools is needed.

It is noted that all steps of the above flow chart are not necessarily implemented. For example, in box 12 it could be determined if UL FSS and combined cell are both enabled, if only UL FSS is determined, if only combined cell is enabled or if none of the features is enabled, and then the corresponding action is taken, i.e. how and if to prepare SRS resource pools. The flow chart is used to exemplify the considerations that should be done, and other variations to make the determinations are also possible.

Figure 3:
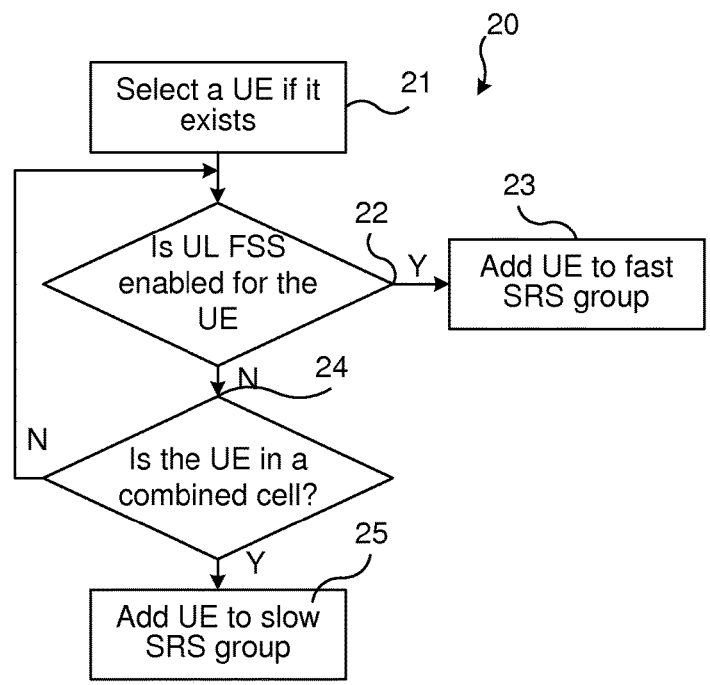
FIG. 3 illustrates a procedure for grouping communication devices.

FIG. 3 illustrates a procedure 20 for grouping communication devices to a respective SRS resource pool. In this procedure 20 communication devices 5 are grouped into one of two candidate groups, one candidate group for the communication devices requesting slow SRS resource and another candidate group for the communication devices requesting a fast SRS resource. The grouping of communication devices may be performed in accordance with what is described in the following.

After random access procedure, wherein communication devices seek access to the communication system, it may be configured with SRS resources. The SRS resource parameters may be sent through Radio Resource Control (RRC) signaling for communication device setup. The network node 3 may then decide, for each communication device 5, how to group it, i.e. into which candidate group to place it. In box 21, the selection for a particular communication device 5 is initiated.

The flow continues to box 22, wherein it is determined, for the particular communication device 5, if UL FSS may be enabled for it, e.g. if the communication device supports UL FSS and/or if it is in a favorable condition to enable UL FSS. If so, then (box 23) this communication device 5 is added to a fast SRS group, i.e. classified as a communication device 5 needing fast SRS resources. If UL FSS is not enabled for this communication device 5, then the flow continues to box 24.

A favorable condition may for example be that the communication device 5 has a Channel Quality Indicator (CQI) configured by the operator of the communication system, for which CQI UL FSS is applicable. Another example comprises the communication device having a big enough buffer size based e.g. on Buffer Status Report (BSR) or traffic pattern prediction. As yet another example, there will typically be good performance gain when UL FSS is used. The performance gain can be estimated based on the number of sectors (within the combined cell) that the communication device selects. If the communication device selects only one sector in the combined cell 6 and the number of antennas per sector is one or two, it may be considered to have good UL FSS gain.

In box 24, now having a communication device 5 that is not (at the moment at least) enabled for UL FSS, it is determined if the communication device 5 is in a combined cell 6. If so, then (box 25) the communication device 5 is added to a slow SRS group, i.e. classified as a communication device 5 only needing slow SRS resources. If in box 24, it is determined that the communication device 5 is not in a combined cell 6, then the steps 22 and 24 may be repeated continuously or at certain intervals. The communication device 5 might not need any SRS resources at all then, if it is neither in a combined cell nor scheduled with UL FSS.

Further, box 22 should be returned to in order to determine whether a communication device has reached favorable conditions for UL FSS. Once the communication device 5 is in a favorable condition such as to enable UL FSS, it will be moved to the fast SRS group. Examples of such favorable conditions were given above.

When a communication device 5 is configured with fast SRS, sector selection will be based on the SRS measurement of the fast SRS configuration. Once the favorable condition does not hold anymore for the communication device, the communication device 5 will be re-configured with slow SRS again.

Figure 4:
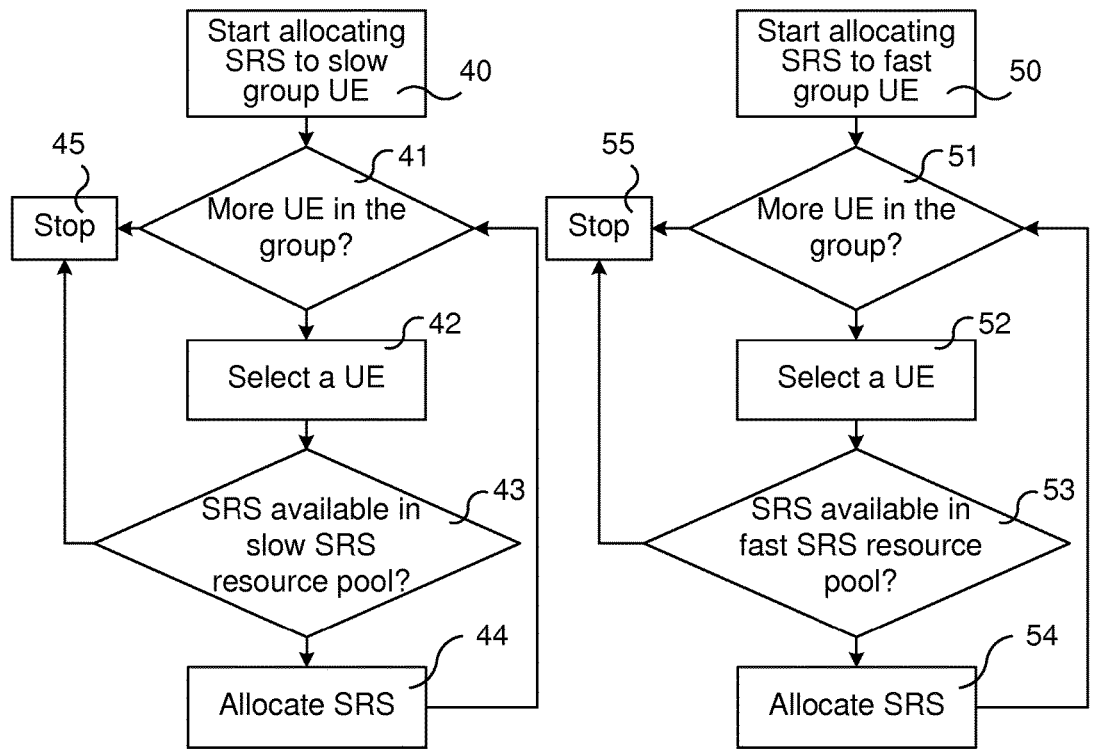
FIG. 4 illustrates the allocation of SRS resources for communication devices.

FIG. 4 illustrates the allocation of SRS resources for communication devices in the respective group. To the left, the allocation of SRS resources to communication devices belonging to the slow SRS group is illustrated. To the right, the allocation of SRS resources to communication devices belonging to the fast SRS group is illustrated. Briefly, for each SRS candidate group, a communication device is selected and assigned requested SRS resource one by one until there is not SRS resource left in the corresponding SRS resource pool.

In box 40, the allocation starts of SRS resources to a communication device (denoted UE, user equipment in FIG. 4) belonging to the slow SRS group, i.e. only needing slow SRS resources. In box 41, it is determined whether there is at least one such communication device in the slow SRS group. If there are no communication devices then the flow stops (box 45). If there is at least one, then in box 42 one of them is selected (if only one, then this is selected). In box 43, it is determined whether there are any slow SRS resources available in the slow SRS resource pool. If so, then such slow SRS resource is allocated to the communication device. This allocation entails sending an RRC configuration message to the communication device 5. Such RRC configuration message may comprise e.g. information such as which comb and which code to use by a particular communication device 5. If the slow SRS resource pool is emptied, i.e. no SRS resources available, then the flow stops (box 45).

The above is applicable also for the allocation of fast SRS resources. In particular, in box 50, the allocation starts of SRS resources to a communication device (UE) belonging to the fast SRS group, i.e. only needing fast SRS resources. In box 51, it is determined whether there is at least one such communication device in the fast SRS group. If there are no communication devices then the flow stops (box 55). If there are at least one, then in box 52 one of them is selected (if only one, then this is selected). In box 53, it is determined whether there are any fast SRS resources available in the fast SRS resource pool. If so, then such fast SRS resource is allocated to the communication device. If the fast SRS resource pool is emptied, i.e. no SRS resources available, then the flow stops (box 55).

Figure 5:
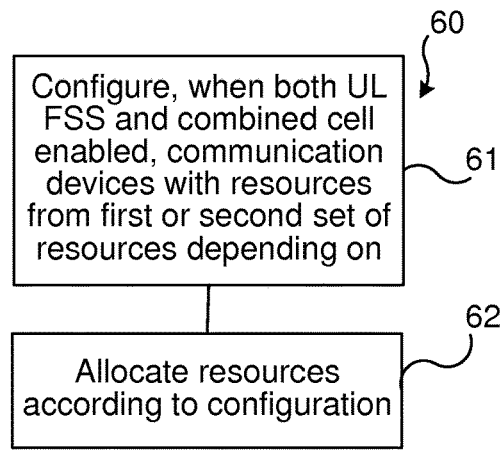
FIG. 5 illustrates a flow chart over steps of a method in a network node in accordance with the present disclosure.

The various features of the present disclosure may be combined in different ways. In the following one such combination is described. Thus, FIG. 5 illustrates a flow chart over steps of method 60 according to the present disclosure is described.

The method 60 may be implemented and performed in a network node 3 for allocating uplink reference signal resources. The network node 3 is capable of, e.g. configurable for, uplink frequency selective scheduling and combined cell configuration. The network node 3 is further arranged to provide wireless communication to a communication device 5. The network node is able to perform the uplink frequency selective scheduling and/or the combined cell configuration for the communication device 5.

The method 60 comprises configuring 61, when both uplink frequency selective scheduling and the combined cell configuration are enabled, a communication device 5 for which uplink frequency selective scheduling is enabled with resources from a second set of resources and configuring other communication devices 5 with resources from a first set of resources. This configuration may be done in RRC signaling.

The method 60 comprises allocating 62 uplink reference signal resources from the first set of resources or the second set of resources to the communication devices 5 according to the configuration.

The method 60 provides an improved SRS allocation scheme, enabling co-existence of UL FSS and combined cell, with sufficiently good capacity and performance. The various features presented are completely aligned with current standard and thus brings up no compatibility issue for communication devices.

In an embodiment the method 60 comprises setting configuration parameters for the first set of resources in accordance with requirements of the combined cell configuration, and setting configuration parameters for the second set of resources in accordance with requirements of the uplink frequency selective scheduling. For example, SRS configuration parameters for the first set of resources may preferably comprise a long periodicity, to be measured per sector etc. In contrast, SRS configuration parameter for the second set of resources may preferably comprise a short periodicity, be measured in the entire frequency band etc.

In an embodiment the method 60 comprises determining that a communication device 5 configured for use of the first set of resources should be enabled for uplink frequency selective scheduling and then reconfiguring the communication device 5 for use of the second set of resources.

In a first variation of the above embodiment, the determining comprises receiving from the communication device 5 a Channel Quality Indicator report indicating values for which the uplink frequency selective scheduling is to be enabled. The network node 3 may compare a CQI value of the CQI-report to a threshold and determine that UL FSS should be enabled for this communication device.

In a second variation of the above embodiment, the determining comprises receiving from the communication device 5 a Buffer Status Report indicating a value above a threshold value for which the uplink frequency selective scheduling is to be enabled. The network node 3 may compare a value of the buffer status report to a threshold value and thereby determine that UL FSS should be enabled for this communication device.

In a third variation of the above embodiment, the determining comprises estimating a performance gain of using uplink frequency scheduling to be above a threshold value, the performance gain being estimated based on number of sectors of the combined cell selected by the communication device 5. The network node 3 may estimate the performance gain for the communication device e.g. by determining that the communication device at hand only has one sector and/or is located close to sector edge and would presumably benefit from UL FSS.

This embodiment provides an example of a communication device selection scheme for deciding when a communication device should be configured with fast SRS in order to enable UL FSS, and making it possible to use UL FSS in most cell configurations, and in particular in a combined cell configuration.

In an embodiment the method 60 comprises determining that a communication device 5 configured for use of the second set of resources fails to fulfil a criterion for use of frequency selective scheduling and reconfiguring the communication device 5 for use of the first set of resources. By checking whether a communication device uses UL FSS or not, processing power as well as SRS resources can be saved by switching to use of slow SRS resources. It is noted that the above three different criteria may be used for this determination. In particular, it may be determined that the communication device 5 reports a CQI value below a threshold for which UL FSS is to be enabled, or the communication device may report a buffer status value below a threshold value for which UL FSS is to be enabled, or a performance gain of using UL FSS may be estimated to be below a threshold value for which the communication device should not be enabled for UL FSS. It is noted that still other criterion may be used for this determination.

In the various embodiments, the uplink reference signal resources may comprise sounding reference signal resources. This is an uplink reference signal resource required to be sent by the communication device both when utilizing combined cell feature and when utilizing UL FSS.

Figure 6:
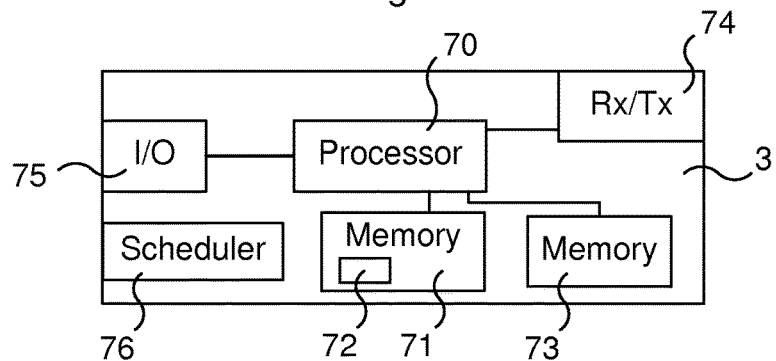
FIG. 6 illustrates schematically a network node and means for implementing methods of the present disclosure.

FIG. 6 illustrates schematically a network node and means for implementing methods of the present disclosure. The network node 3 comprises a processor 70 comprising any combination of one or more of a central processing unit (CPU), multiprocessor, microcontroller, digital signal processor (DSP), application specific integrated circuit etc. capable of executing software instructions stored in a memory 71, which can thus be a computer program product 71. The processor 70 can be configured to execute any of the various embodiments of the method e.g. as described in relation to FIG. 5.

The network node 3 may comprise an interface, e.g. in the form of an input/output device 75, for communicating with other network nodes. The network node 3 may further comprise receiving/transmitting means 74, e.g. circuitry, antennas etc., for enabling wireless communication for the communication devices 5 residing within its coverage area. Alternatively, the network node 3 may be arranged to control such receiving/transmitting means.

The network node 3 may further comprise a scheduler 76, in particular an uplink scheduler, configured to allocate the uplink reference signal resources to the communication devices.

A network node 3 is thus provided for allocating uplink reference signal resources. The network node 3 is capable of (e.g. configurable for) uplink frequency selective scheduling and combined cell configuration. The network node 3 is further arranged to provide wireless communication to a communication device 5. The network node 3 comprises a processor 70 and memory 71, the memory 71 containing instructions executable by the processor 70, whereby the network node 3 is operative to:
  configure, when both uplink frequency selective scheduling and the combined cell configuration are enabled, a communication device 5 for which uplink frequency selective scheduling is enabled with resources from a second set of resources and configuring other communication devices 5 with resources from a first set of resources, and
  allocate uplink reference signal resources from the first set of resources or the second set of resources to the communication devices 5 according to the configuration.

In an embodiment, the network node 3 is configured to set configuration parameters for the first set of resources in accordance with requirements of the combined cell configuration, and set configuration parameters for the second set of resources in accordance with requirements of the uplink frequency selective scheduling.

In an embodiment, the network node 3 is configured to determine that a communication device 5 configured for use of the first set of resources should be enabled for uplink frequency selective scheduling and configured to reconfigure the communication device 5 for use of the second set of resources.

In variations of the above embodiment, the network node 3 is configured to determine by:
  receiving from the communication device 5 a Channel Quality Indicator report indicating values for which the uplink frequency selective scheduling is to be enabled, or
  receiving from the communication device 5 a Buffer Status Report indicating a value above a threshold value for which the uplink frequency selective scheduling is to be enabled, or
  estimating a performance gain of using uplink frequency scheduling to be above a threshold value, the performance gain being estimated based on number of sectors of the combined cell selected by the communication device 5.

In an embodiment, the network node 3 is configured to determine that a communication device 5 configured for use of the second set of resources fails to fulfil a criterion for use of frequency selective scheduling and reconfiguring the communication device 5 for use of the first set of resources.

In an embodiment, the uplink reference signal resources comprise sounding reference signal resources.

Still with reference to FIG. 6, the memory 71 can be any combination of read and write memory (RAM) and read only memory (ROM). The memory 71 also comprises persistent storage, which, for example, can be any single one or combination of magnetic memory, optical memory, solid state memory or even remotely mounted memory.

A data memory 73 may also be provided for reading and/or storing data during execution of software instructions in the processor 70. The data memory 73 can be any combination of read and write memory (RAM) and read only memory (ROM).

The present disclosure also encompasses a computer program product 71 comprising a computer program 72 for implementing the embodiments of the method as have been described, and a computer readable means on which the computer program 72 is stored. The computer program product 71 may be any combination of read and write memory (RAM) or read only memory (ROM). The computer program product 71 may also comprise persistent storage, which for example can be any single one or combination of magnetic memory, optical memory or solid state memory.

The present teachings thus comprise a computer program 72 for a network node 3 for allocating uplink reference signal resources, the network node 3 being capable of uplink frequency selective scheduling and combined cell configuration, and to provide wireless communication to a communication device 5. The computer program 72 comprises computer program code, which, when run on the network node 3 causes the network node 3 to:
  configure, when both uplink frequency selective scheduling and the combined cell configuration are enabled, a communication device 5 for which uplink frequency selective scheduling is enabled with resources from a second set of resources and configuring other communication devices 5 with resources from a first set of resources, and allocating 62 uplink reference signal resources from the first set of resources or the second set of resources to the communication devices 5 according to the configuration.

The present disclosure also encompasses a computer program product 71 comprising a computer program 72 as described above, and a computer readable means on which the computer program 72 is stored.

Figure 7:
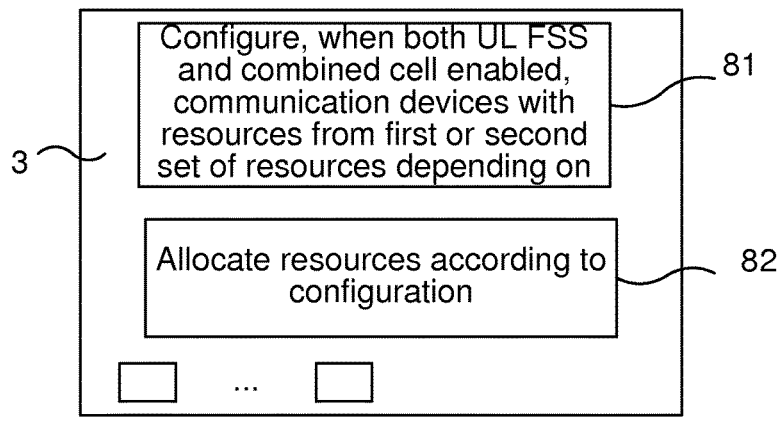
FIG. 7 illustrates a network node comprising functions modules/software modules for implementing methods of the present disclosure.

An example of an implementation using function modules/software modules is illustrated in FIG. 7, in particular illustrating network node 3 comprising function modules for implementing embodiments of the method of the present disclosure. The network node 3 comprises means, for example a first function module 81, for configuring 61, when both uplink frequency selective scheduling and the combined cell configuration are enabled, a communication device 5 for which uplink frequency selective scheduling is enabled with resources from a second set of resources and configuring other communication devices 5 with resources from a first set of resources. The network node 3 comprises means, for example a second function module 82, for allocating 62 uplink reference signal resources from the first set of resources or the second set of resources to the communication devices 5 according to the configuration.

Such means, e.g. function modules 81, 82, can be implemented using software instructions such as computer program executing in a processor and/or using hardware, such as application specific integrated circuits, field programmable gate arrays, discrete logical components etc. It is noted that yet additional function modules (indicated by empty boxes in the FIG. 7) may be provided for providing means for features of still other embodiments.

For example, means, e.g. a function module, may be provided for setting configuration parameters for the first set of resources in accordance with requirements of the combined cell configuration, and setting configuration parameters for the second set of resources in accordance with requirements of the uplink frequency selective scheduling.

Means, e.g. a function module may be provided for determining that a communication device 5 configured for use of the first set of resources should be enabled for uplink frequency selective scheduling and reconfiguring the communication device 5 for use of the second set of resources.

The above means, e.g. function module, may determine by:
receiving from the communication device 5 a Channel Quality Indicator report indicating values for which the uplink frequency selective scheduling is to be enabled, or by
receiving from the communication device 5 a Buffer Status Report indicating a value above a threshold value for which the uplink frequency selective scheduling is to be enabled,
or by
estimating a performance gain of using uplink frequency scheduling to be above a threshold value, the performance gain being estimated based on number of sectors of the combined cell selected by the communication device 5.

Means, e.g. a function module, may be provided for determining that a communication device 5 configured for use of the second set of resources fails to fulfil a criterion for use of frequency selective scheduling and reconfiguring the communication device 5 for use of the first set of resources.

Modifications of the disclosed embodiments and other embodiments will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method performed in a network node for allocating uplink reference signal resource, the network node being capable of uplink frequency selective scheduling and combined cell configuration, the network node further being arranged to provide wireless communication to a communication device, the method comprising:
configuring, when both uplink frequency selective scheduling and the combined cell configuration are enabled, a communication device for which uplink frequency selective scheduling is enabled with resources from a second set of resources and configuring other communication devices with resources from a first set of resources,
allocating uplink reference signal resources from the first set of resources or the second set of resources to the communication devices according to the configuration;
determining that a communication device configured for use of the first set of resources should be enabled for uplink frequency selective scheduling and reconfiguring the communication device for use of the second set of resources, and
setting configuration parameters for the first set of resources in accordance with requirements of the combined cell configuration, and setting configuration parameters for the second set of resources in accordance with requirement of the uplink frequency selective scheduling.

2. The method as claimed in claim 1, wherein the determining comprises:
receiving from the communication device a Channel Quality Indicator report indicating values for which the uplink frequency selective scheduling is to be enabled, or
receiving from the communication device a Buffer Status Report indicating a value above a threshold value for which the uplink frequency selective scheduling is to be enabled, or
estimating a performance gain of using uplink frequency scheduling to be above a threshold value, the performance gain being estimated based on number of sectors of the combined cell selected by the communication device.

3. The method as claimed in claim 1, comprising determining that a communication device configured for use of the second set of resources fails to fulfil a criterion for use of frequency selective scheduling and reconfiguring the communication device for use of the first set of resources.

4. The method as claimed in claim 1, comprising determining that a communication device configured for use of the second set of resources fails to fulfil a criterion for use of frequency selective scheduling and reconfiguring the communication device for use of the first set of resources.

5. A network node for allocating uplink reference signal resources, the network node being capable of uplink frequency selective scheduling and combined cell configuration, the network node further being arranged to provide wireless communication to a communication device, the network node comprising a processor and memory, the memory containing instruction executable by the processor, whereby the network node is operative to:

configure, when both uplink frequency selective scheduling and the combined cell configuration are enabled, a communication device for which uplink frequency selective scheduling is enabled with resources from a first set of resources, allocate uplink reference signal resources from the first set of resources or the second set of resources to the communication devices according to the configuration;

determine that a communication device configured for use of the first set of resources should be enabled for uplink frequency selective scheduling and configured to reconfigure the communication device for use of the second set of resources, and configured to set configuration parameters for the first set of resources in accordance with requirements of the combined cell configuration, and set configuration parameters for the second set of resources in accordance with requirements of the uplink frequency selective scheduling.

6. The network node as claimed in claim 5, configured to determine by: receiving from the communication device a Channel Quality Indicator report indicating values for which the uplink frequency selective scheduling is to be enabled, or receiving from the communication device a Buffer Status Report indicating a value above a threshold value for which the uplink frequency selective scheduling is to be enabled, or estimating a performance gain of using uplink frequency scheduling to be above a threshold value, the performance gain being estimated based on number of sectors of the combined cell selected by the communication device.

7. The network node as claimed in claim 5, comprising determining that a communication device configured for use of the second set of resources fails to fulfil a criterion for use of frequency selective scheduling and reconfiguring the communication device for use of the first set of resources.

8. The network node as claimed in claim 5, wherein the uplink reference signal resources comprise sounding reference signal resources.

9. A non-transitory computer readable medium for a network node for allocating uplink reference signal resources, the network node being capable of uplink frequency selective scheduling and combined cell configuration, and to provide wireless communication to a communication device, the non-transitory computer readable medium comprising computer program code, which, when run on the network node causes the network node to:

configure, when both uplink frequency selective scheduling and the combined cell configuration are enabled, a communication device for which uplink frequency selective scheduling is enabled with resources from a second set of resources and configuring other communication devices with resources from a first set of resources, allocate uplink reference signal resources from the first set of resources or the second set of resources to the communication devices according to the configuration, determine that a communication device configured for use of the first set of resources should be enabled for uplink frequency selective scheduling and configured to reconfigure the communication device for use of the second set of resources, and configured to set configuration parameters for the first set of resources in accordance with requirements of the combined cell configuration, and set configuration parameters for the second set of resources in accordance with requirements of the uplink frequency selective scheduling.

* * * * *